United States Patent
Seufert et al.

(10) Patent No.: US 8,162,115 B2
(45) Date of Patent: Apr. 24, 2012

(54) ACTUATOR ARRANGEMENT FOR A MOTOR VEHICLE CLUTCH

(75) Inventors: Martin Seufert, Steinheim (DE); Tobias Kalisch, Villingen-Schwenningen (DE); Ralf Hettich, Filderstadt (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 18 days.

(21) Appl. No.: 12/430,835

(22) Filed: Apr. 27, 2009

(65) Prior Publication Data

US 2009/0255773 A1     Oct. 15, 2009

Related U.S. Application Data

(63) Continuation of application No. PCT/EP2007/009239, filed on Oct. 24, 2007.

(30) Foreign Application Priority Data

Oct. 26, 2006 (DE) .................. 10 2006 051 287

(51) Int. Cl.
*F16D 48/06* (2006.01)
(52) U.S. Cl. .................................... 192/48.2; 192/84.6
(58) Field of Classification Search ............ 192/48.2, 192/84.6, 40; 477/907
See application file for complete search history.

(56) References Cited

U.S. PATENT DOCUMENTS

| | | | |
|---|---|---|---|
| 5,996,754 A | 12/1999 | Reed, Jr. et al. | |
| 6,589,132 B2 * | 7/2003 | Amisano et al. | 477/77 |
| 6,814,197 B2 * | 11/2004 | Heiartz et al. | 192/20 |
| 2006/0223672 A1 | 10/2006 | Kumazawa | |

FOREIGN PATENT DOCUMENTS

| | | |
|---|---|---|
| DE | 101 38 395 A1 | 2/2003 |
| DE | 699 22 025 T2 | 11/2005 |
| EP | 1 176 329 A1 | 1/2002 |
| GB | 2 191 875 A | 12/1987 |
| WO | WO 96/25612 | 8/1996 |

OTHER PUBLICATIONS

English Translation of PCT International Preliminary Report on Patentability; Application No. PCT/EP2007/009239; Filed Oct. 24, 2007.

* cited by examiner

*Primary Examiner* — Richard M. Lorence
(74) *Attorney, Agent, or Firm* — Knobbe, Martens, Olson & Bear, LLP

(57) ABSTRACT

An actuator arrangement for a clutch of a drive train for motor vehicles. The clutch is prestressed into an opened position and can be activated electromechanically. An electric motor can be coupled to the clutch in order to activate it. A control unit actuates the electric motor. The actuator arrangement has a safety device which is connected to the electric motor parallel to the control unit. The safety device is configured, in the case of a fault state, to supply electrical power to the electric motor independently of the control unit in order to open the clutch.

18 Claims, 1 Drawing Sheet

ACTUATOR ARRANGEMENT FOR A MOTOR VEHICLE CLUTCH

CROSS-REFERENCE TO RELATED APPLICATIONS

This is a Continuation application of International patent application PCT/EP2007/009239, filed Oct. 24, 2007, which claims the priority of German patent application DE 10 2006 051 287, filed Oct. 26, 2006.

BACKGROUND OF THE INVENTION

The present invention relates to an actuator arrangement for a clutch of a drive train for motor vehicles, which clutch is prestressed into an opened position and can be activated electromechanically, having an electric motor which can be coupled to the clutch in order to activate it, and having a control unit for actuating the electric motor.

Clutches for motor vehicles are available in different designs. Nowadays, the prior art comprises dry clutches which are opened by pressing a clutch pedal. Without activation, these clutches are normally closed. New clutch systems in double clutch gear mechanisms have now become available on the market.

These double clutches are frequently activated hydraulically and are generally normally open, i.e. without activation the clutch opens. This has the advantage that in the event of a fault (for example when there is a loss of pressure) both clutches open and a safe state is therefore assumed. In this context it is sufficient to allow only a small quantity of pressurized oil to escape from the hydraulic activation cylinders of the double clutches in order to eliminate the pressure completely, i.e. as far as the kiss point of the clutch. This occurs very quickly with hydraulic clutches. Even when there is a serious fault (for example processor fault, etc.) in the case of a reset, the two clutches open sufficiently quickly in order to bring about the safe state. In the case of a reset, all the outputs of the control unit (SG) are switched off in a controlled fashion and the control unit is subsequently rebooted.

Closing the two clutches simultaneously with gear speeds engaged in both component gearboxes could lead to a stressed state in the gearbox, with the risk of the drive axle becoming locked.

Furthermore, clutch systems according to the normally stay (or normally hold) principle are also known. In these actuator arrangements, the respective clutch is held in the current state.

In the case of double clutch gear mechanisms, as well as hydraulically activated systems increasing emphasis is being put on electromechanically activated systems. The reasons for this are lower complexity, an advantage in terms of consumption (less energy required for activating the clutch) and lower costs. However, these systems have, due to the system, slight deficits in the field of dynamics. Such electromechanically activated double clutches (that is to say clutches activated by electric motors or solenoids etc.) achieve sufficiently good actuation times when activated actively by the electric motors, with the result that the safe state can be brought about by actively opening the clutches.

These clutches have also preferably been embodied in the past as normally open systems (for the same reasons as above: a safe state is brought about automatically). The restoring force for opening the clutches is produced here by means of a spring. In the case of a reset, the springs must therefore open the two clutches, and at the same time the two electric motors and the coupling elements between the electric motors and the clutches must also be accelerated. This creates problems owing to the considerable moment of mass inertia of the electric motors and the high transmission ratio between the clutches and the electric motors. Furthermore, a very strong restoring spring has to be installed, which gives rise to costs and problems in terms of installation space, and leads to high activation forces when the clutches are closed. As a result, the reductions in consumption which are hoped for in the case of electromechanical actuator arrangements are at least diminished. The loading on the on-board power system of the vehicle increases, due to the high currents of the electric motors, to a high, or even unacceptable, degree.

When a fault state occurs, it may therefore be difficult to open the clutches within the necessary short time in order to bring about the safe state in good time.

Document US 2006/0223672 A1 discloses an automated change-speed gear mechanism whose clutch actuator has at least two electric motors for actuating the clutch. If one of the electric motors fails, this can be sensed. The clutch is a normally closed clutch.

In addition, document DE 101 38 395 A1 discloses an emergency activation device for a hydraulically activated clutch which is also embodied as normally closed.

In this context, in order to perform emergency opening of the clutch in the case of a fault, a pressure accumulator is provided by means of which the clutch can be reliably transferred from the normally closed state into an opened state even when the fault state occurs.

A double clutch gear mechanism with electromechanical activation is known from DE 699 22 025 T2.

BRIEF SUMMARY OF THE INVENTION

The object of the invention is to specify an electromechanical actuator arrangement for a clutch of a motor vehicle, which clutch is prestressed into an opened position and with which, in the case of a fault state, rapid opening, in particular of the clutch, is possible.

This object is achieved, according to a first aspect, by means of an actuator arrangement for a clutch of a drive train for motor vehicles, which clutch is prestressed into an opened position and can be activated electromechanically, having an electric motor which can be coupled to the clutch in order to activate it, and having a control unit for actuating the electric motor, wherein the actuator arrangement has a safety device which is connected to the electric motor parallel to the control unit, and is configured, in the case of a fault state, to supply electrical power to the electric motor independently of the control unit in order to open the clutch.

Also the above object is achieved, according to a second aspect, by an actuator arrangement for a double clutch arrangement of a double clutch gear mechanism, having two electric motors which can be coupled to a respective clutch of the double clutch arrangement, and having a control unit for actuating the electric motors, wherein the actuator arrangement has a safety device which is connected to the electric motors parallel to the control unit, and is configured, in the case of a fault state, to supply electrical power to the electric motors independently of the control unit.

In principle, fault states are relevant in which, without activation (that is to say in the passive state), the clutches are to open or be held (normally open or normally stay), that is to say for example in the case of a reset such as in the case of a processor fault or a software error. In the case of a reset, the outputs of the control unit are suddenly switched off in the prior art, which leads to the clutches opening slowly.

The control unit is now designed in terms of hardware, or expanded by an independent safety device, in such a way that active activation of the clutch in the fault state is possible even when the control unit fails. In this context, it is preferred that this activation takes place independently of the main processor in the control unit, and therefore also independently of software, i.e. preferably takes place purely as a result of hardware wiring. As a result, the activation time of the clutch can be reduced. Consequently, all the currently known faults which involve the electric motor being functionally capable (that is to say processor fault, software error, etc.) can preferably be transformed within a short time into a safe state in all driving situations.

In the case of double clutch gear mechanisms which operate according to the normally open principle, it is possible, for example in the case of a fault state (or of a reset), to energize the two electric motors of the clutches for at least a preferably defined time in the direction of "open clutch".

The invention makes it possible to ensure that:
- the spring force of the restoring spring for opening the clutch can be reduced,
- as a result even further consumption advantages can therefore be achieved (less holding energy),
- the current load on the on-board power system of the vehicle drops,
- less installation space is required for a weaker spring and the activation kinematics between the spring and electric motor,
- lower costs for the weaker spring and the activation kinematics between the spring and electric motor are entailed.

Basically, the abovementioned invention which has been described using the example of an electromechanically activated double clutch of a normally open design can be implemented as follows:
- it can also be applied to single clutches,
- it can be applied to dry or wet clutches (single or double),
- it can be applied both to normally open clutches and to normally stay clutches.

Normally closed is mentioned only for the sake of completeness. A system according to the normally stay principle can, however, certainly be implemented; in such a case the maximum of the advantages described above would be able to be achieved.

In the actuator arrangement according to the first aspect, it is preferred if the safety device has a safety hardware component which is provided separately from the control unit.

In this way, the safety device can operate unaffected by any fault state of the control unit.

In addition it is preferred if the safety device has a fault detection sensor which detects a fault state of the control unit.

This can preferably take place by virtue of the fact that the fault detection sensor detects when the power supply of the control unit drops below a certain level and/or the control unit is subjected to a reset.

The fault detection sensor may be embodied, for example, using simple hardware as a comparison module which compares a voltage of the control unit with a reference voltage or interrogates a reset signal.

In addition or as an alternative to this, the control unit can have a fault detection sensor which detects a fault state of the control unit and is configured to trigger a reset of the control unit.

In this embodiment, the control unit is preferably of failsafe design. This is to be understood as meaning that the control unit has, for example, two processors (redundancy), a monitoring device (watchdog) and/or some other signal monitoring means.

If the control unit is of such a failsafe design, the control unit can itself detect faults such as processor faults or software errors and subsequently trigger a reset.

In this case, there is no need for a separate fault detection sensor in the safety device. Instead, the fault detection sensor of the control unit can be connected to the safety device and can, for example, immediately trigger a safety switch there.

The term fault detection sensor is to be understood generally here in the sense of a device which is capable of detecting a fault state.

In addition, it is advantageous if the safety device has a safety switch which is activated by the fault detection sensor in order to connect a power supply to control electronics which are configured to actuate the electric motor in order to open the clutch.

The control electronics in this context can preferably also be embodied using comparatively simple hardware and separately from the control unit, that is to say independently of this control unit. The control electronics can accordingly be formed by a simple hardware module, but they can also be formed by an ASIC. Generally, it is also conceivable for the control electronics to have a separate processor, that is to say a separate intelligence. In addition it is generally also conceivable for the control electronics to have separate power electronics for the electric motor. In the latter case, the control electronics can, for example, also compensate faults in the power electronics which are normally present.

According to a further preferred embodiment, the control electronics have a timer element which temporally limits the actuation of the electric motor.

Since the clutch in an automated change-speed gear mechanism or the two clutches of a double clutch gear mechanism are generally prestressed in the opening direction, the "intervention" of the safety device is generally necessary only for a short time period in order to open the clutch/clutches very quickly. After this relatively short time period, an open state of the clutch/clutches occurs in any case owing to the prestress, with the result that further intervention by the safety device is not necessary.

According to a further preferred embodiment, power electronics are arranged between the safety device and the electric motor.

In this context, the safety device can, as it were, access, parallel to the control unit, the power electronics which are present in any case. It is therefore not necessary for the safety device to contain separate power electronics.

If the control electronics of the safety device have separate power electronics, the safety device preferably intervenes between the standard power electronics (present in any case) and the electric motor.

In the case of the actuator arrangement for a double clutch arrangement according to the second aspect the advantageous embodiments above can be applied in a corresponding way.

In addition, it is preferred here if both clutches are prestressed into the opened position.

In addition, in all the embodiments of the invention, the safety device can generally be connected to the same energy source (energy store) as the control unit.

According to an alternative embodiment, it is, however, also possible in the case of the actuator arrangements according to the invention for the safety device to have a separate electrical energy store and to be configured, in the case of a fault state, to supply electrical power to the electric motor from the separate electric energy store independently of the control unit.

Of course, the features which are mentioned above and which are still to be explained below can be used not only in the respectively specified combination but also in other combinations or alone, without departing from the scope of the present invention.

BRIEF DESCRIPTION OF THE SEVERAL VIEWS OF THE DRAWING

Exemplary embodiments of the invention are illustrated in the drawing and will be explained in more detail in the following description. In said drawing.

DETAILED DESCRIPTION OF THE INVENTION

Figure 1:
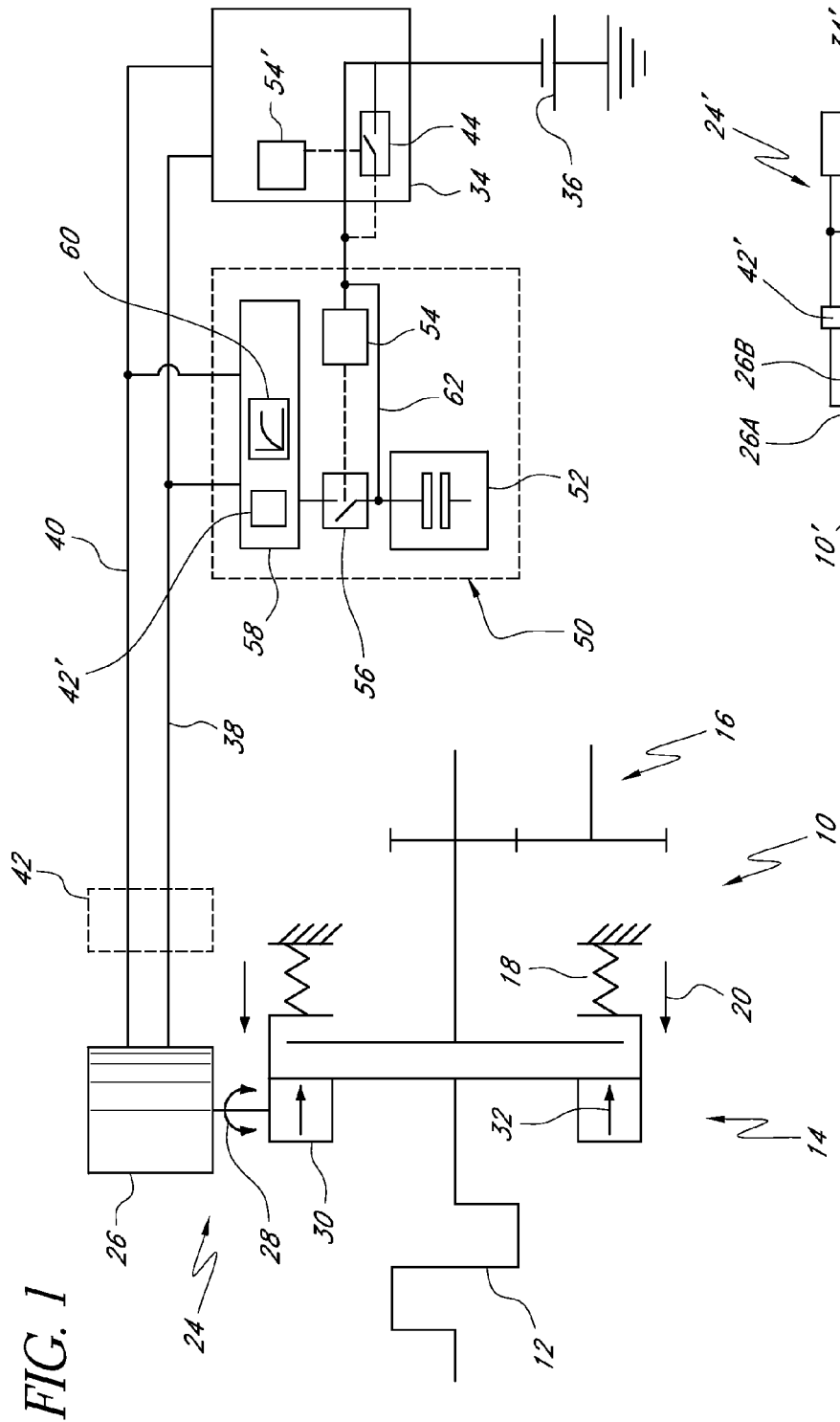
FIG. 1 is a schematic view of a motor vehicle drive train having an actuator arrangement according to the invention for activating a single clutch.

In FIG. 1, a drive train for a motor vehicle is denoted generally by 10. The drive train 10 contains an internal combustion engine 12, a clutch 14 and a step-by-step change-speed gear mechanism 16. An output shaft of the internal combustion engine 12 (or of another drive motor) is connected to an input element of the clutch 14. An output element of the clutch 14 is connected to an input shaft of the step-by-step change-speed gear mechanism 16. The step-by-step change-speed gear mechanism 16 may be, for example, a spur tooth gear mechanism.

18 denotes a mechanical energy store which prestresses the clutch 14 in a basic state into an opened position. The corresponding activation direction in the opened position is denoted by 20.

In order to activate the clutch 14, an actuator arrangement according to an embodiment of the present invention is provided and denoted by 24.

The actuator arrangement is embodied as an electromechanical actuator arrangement and it contains an electric motor 26. Drive movements of the electric motor 26 are represented as rotational directions 28. In addition, a rotation-translational converter 30 is provided which converts the rotational movements of the output shaft of the electric motor 26 into linear movements for activating the clutch 14. The activation direction of the clutch 14, which is generally provided for closing the clutch 14 and is opposed to the direction 20, is denoted by 32.

The actuator arrangement 24 also contains a control unit 34 which can have, for example, a microcontroller and which is connected to a supply voltage 36 (for example a battery voltage of the motor vehicle).

The control unit 34 is connected via actuation lines 38, 40 to power electronics 42 by means of which the electric motor 26 can be actuated.

Since the control unit 34 has a microprocessor or microcontroller on which computer programs run, a reset logic 44 is additionally provided in association with the control unit 34.

The control unit 34 is preferably of failsafe design. For this purpose, the control unit 34 has, for example, two processors which compensate for one another, a monitoring device such as a watchdog and/or an internal signal monitoring means.

Accordingly, the control unit 34 is itself preferably capable of triggering a reset by means of the reset logic 44 if a fault is detected.

Accordingly, a "fault detection sensor" 54', which can detect such fault states of the control unit 34, is incorporated in the control unit 34 in FIG. 1.

Generally it is also possible for a superordinate control device (not illustrated) to detect when the control unit 34 is not operating correctly. The superordinate control device can then trigger a reset of the control unit 34 by means of the reset logic 44. In the case of a reset, a basic program of the control unit 34 restarts (the control unit 34 is rebooted). In addition, in the case of a reset certain control parameters are returned to their basic state.

The actuator arrangement 24 also has a safety device which is provided separately from or independently of the control unit 34 and is in the form of a safety hardware component 50.

The safety hardware component 50 can, as illustrated, be connected to the supply voltage 36 (if appropriate via the control unit 34). Alternatively it is also possible to provide an additional electrical energy store 52 (for example an electrolytic capacitor, an accumulator or the like), in the safety hardware component 50.

The safety hardware component 50 contains a safety switch 56 and control electronics 58 and optionally a fault detection sensor 54.

The safety hardware component 50 can be constructed from comparatively simple electronic elements and it preferably does not contain a microprocessor or the like.

The fault detection sensor 54 is configured to detect a fault state of the actuator arrangement 24. In the simplest case, the fault detection sensor 54 detects a reset of the control unit 34, which is considered to be a fault state. If a fault detection sensor 54' is provided in the control unit, there is no need for a separate fault detection sensor 54 in the safety hardware component 50. Instead, a corresponding signal of the control unit 34 can also be connected directly to the safety switch 56.

During a reset, the outputs of the control unit 34 on the actuation lines 38, 40 are generally set to zero, with the result that the electric motor 26 is no longer actuated. In this case, the mechanical energy store 18 presses the clutch 14 into the opened state (as a result of which a safe state is brought about). In this context, the mechanical energy store 18 must, however, normally also move the mass of the rotor of the electric motor 26, which leads to a situation in which the opening of the clutch 14 possibly cannot take place quickly enough.

If the fault detection sensor 54, 54' (which can contain, for example, a simple voltage comparator) detects a fault state, the fault detection sensor 54, 54' switches the safety switch 56 on, which safety switch supplies the control electronics 58 with electrical energy (either by means of the supply voltage 36 and/or by means of the electrical energy store 52).

As a result, the control electronics 58 are supplied with energy. The control electronics 58 are configured to output relatively simple signals to the power electronics 42, which signals ensure that the electric motor 26 is driven in the opposite direction, with the result that the electric motor drives the clutch 14 actively in the opening direction 20, and therefore opens it. In other words, in this context, the electric motor 26 supports the effect of the mechanical energy store 18. As a result, the safe opened state of the clutch 14 can be brought about very quickly.

In this context, a simple actuation function for actuating the power electronics 42 can be stored in the control electronics 58. In the simplest case, said function may comprise switching on the electric motor 26 with the correct polarity. Alternatively, it is also possible to store a ramp function in the control electronics 58 (which function may be implemented, for example, by means of a simple counter or the like, that is to say without a microprocessor).

The control electronics 58 can, as mentioned above, be constructed with simple hardware components (standard components). The control electronics 58 can, however, also contain an ASIC or the like. In addition, it is generally also possible for the control electronics to contain a separate intelligence in the form of a microprocessor or the like.

The control electronics 58 can output suitable signals depending on the type of motor used. In the case of a direct current motor, it is possible, as mentioned above, to make available simple step functions or ramp functions. If alternating current motors or three-phase current motors are used, it is, for example, also conceivable for the control electronics 58 to contain an ASIC or the like, which converts simple actuation signals into suitable alternating current signals or three-phase current signals (phase actuation or the like).

If such an alternating current motor or three-phase current motor is used, it is also possible to provide such an ASIC for converting simple control signals into alternating current actuation signals or three-phase current actuation signals in the normal power electronics 42.

Generally it is also possible to provide separate power electronics 42' in the control electronics 58, which power electronics 42' then also contain, if appropriate, such an alternating current or three-phase current conversion ASIC. This is represented schematically as an option in the control electronics 58 in FIG. 1. In this case, it goes without saying that the control electronics 58 do not intervene in parallel in the input of the standard power electronics 42 but rather at the output of the standard power electronics 42 so that the control electronics 58 can actuate the electric motor 26 directly.

If the control electronics 58 also contain power electronics 42', it is possible, if appropriate, also to compensate faults in the standard power electronics 42. It goes without saying that a suitable monitoring function can also be stored in the control unit 34 for this purpose.

In addition, a timer element 60 is provided in the control electronics 58. The timer element 60 serves to limit the actuation of the electric motor 26 to a relatively short time period by means of the safety hardware component 50. The time period is selected such that the clutch 14 is opened reliably and quickly. It is generally also possible to provide the electric motor 26 with just a short current surge by means of the safety hardware component in order to bring about the desired effect.

As soon as the clutch 14 is opened, the mechanical energy store 18 ensures that the clutch remains open. There is therefore no need for further actuation of the electric motor 26 by means of the safety hardware component 50.

If the reset state of the control unit 34 is terminated, a standard control signal can then be transmitted again via the control unit 34 to the power electronics 42 via the lines 38, 40 in order to actuate the electric motor 26 as required.

In addition, 62 denotes a line which indicates the connection of the safety switch 56 to the electrical supply voltage 36 (in addition to or instead of the energy store 52).

Figure 2:
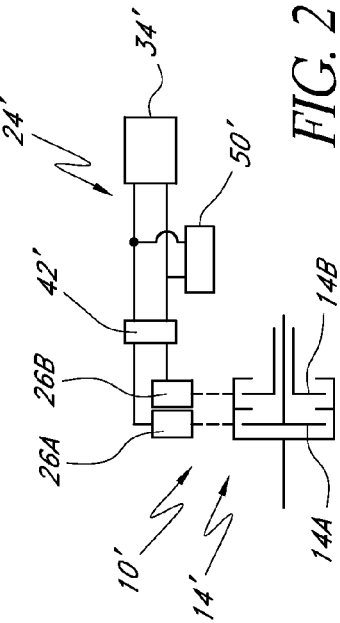
FIG. 2 is a view, comparable to FIG. 1, of a drive train having a double clutch gear mechanism.

FIG. 2 shows an alternative embodiment of an actuator arrangement 24' for a drive train 10' having a double clutch gear mechanism which has a double clutch arrangement 14' with a first friction clutch 14A and a second friction clutch 14B. In a corresponding way. the actuator arrangement 34' has two electric motors 26A, 26B which are actuated by means of power electronics 42' (or by means of two power electronics 42'). Furthermore, the actuator arrangement 24' also has a control unit 34' and an additional safety device 50' which can operate in a way corresponding to that of the safety device 50. When a fault state is detected by means of the safety device 50', it is preferably ensured that both clutches 26A, 26B are opened in a short time.

In addition, the following should be noted.

The control unit 34 can be constructed in terms of hardware (or be expanded with the safety device 50) in such a way that in the case of a reset the voltage supply 62 of the control unit is used to activate the driver modules 42 of the electric motors.

The safety device 50 is illustrated separately from the control unit 34 in FIG. 1; however, it can also be integrated into the control unit, in particular into its housing. The term separate is therefore not to be understood in a spatial fashion but rather in a functional fashion.

The time period of the energization can be determined by means of a timer element 60 and can be matched to the mechanical requirements (clutch, actuator system, electric motors). After brief energization of the electric motors in the direction of opening the clutch, all the outputs are switched off, as in the case of a normal reset. As a result, the safe state can be brought about in good time.

What is claimed is:

1. Actuator arrangement for a clutch of a drive train for motor vehicles, which clutch is prestressed by a mechanical energy store into an opened position and can be activated electromechanically, having an electric motor which can be coupled to the clutch in order to activate it, and having a control unit for actuating the electric motor, wherein the clutch is normally open, so that the clutch opens if not activated by the electric motor, wherein the actuator arrangement has a safety device which is connected to the electric motor parallel to the control unit, and the safety device is configured, in case of a fault state of the control unit, to supply electrical power to the electric motor independently of the control unit in order to always open the clutch and thereby assist the function of the mechanical energy store.

2. Actuator arrangement according to claim 1, wherein the safety device is a safety hardware component which is provided separately from the control unit.

3. Actuator arrangement according to claim 2, wherein the safety device has a separate electrical energy store and is configured, in the case of a fault state, to supply electrical power to the electric motor from the electrical energy store independently of the control unit.

4. Actuator arrangement according to claim 1, wherein the safety device has a fault detection sensor which detects a fault state of the control unit.

5. Actuator arrangement according to claim 4, wherein the fault detection sensor detects at least one of when the power supply of the control unit drops below a certain level and the control unit is subjected to a reset.

6. Actuator arrangement according to claim 1, wherein the control unit has a fault detection sensor which detects a fault state of the control unit and is configured to trigger a reset of the control unit.

7. Actuator arrangement according to claim 1, wherein the safety device has a safety switch which is activated by the fault detection sensor in order to connect a power supply to control electronics which are configured to actuate the electric motor in order to open the clutch.

8. Actuator arrangement according to claim 7, wherein the control electronics have a timer element which temporally limits the actuation of the electric motor.

9. Actuator arrangement according to claim 1, wherein power electronics are arranged between the safety device and the electric motor.

10. Actuator arrangement for a double clutch arrangement of a double clutch gear mechanism, having two electric motors which can be coupled to a respective clutch of the double clutch arrangement, the clutches being prestressed into an opened position by respective mechanical energy stores, and having a control unit for actuating the electric motors, wherein each of the clutches is normally open, so that the clutch opens if not activated by the electric motor, wherein the actuator arrangement has a safety device which is connected to the electric motors parallel to the control unit, and the safety device is configured, in case of a fault state of the control unit, to supply electrical power to the electric motors independently of the control unit in order to always open the clutches and thereby assist the function of the mechanical energy stores.

11. Actuator arrangement according to claim 10, wherein the safety device is a safety hardware component which is provided separately from the control unit.

12. Actuator arrangement according to claim 10, wherein the safety device has a fault detection sensor which detects a fault state of the control unit.

13. Actuator arrangement according to claim 12, wherein the fault detection sensor detects at least one of when the power supply of the control unit drops below a certain level and the control unit is subjected to a reset.

14. Actuator arrangement according to claim 10, wherein the control unit has a fault detection sensor which detects a fault state of the control unit and is configured to trigger a reset of the control unit.

15. Actuator arrangement according to claim 10, wherein the safety device has a safety switch which is activated by the fault detection sensor in order to connect a power supply to control electronics which are configured to actuate the electric motors.

16. Actuator arrangement according to claim 15, wherein the control electronics have a timer element which temporally limits the actuation of the electric motors.

17. Actuator arrangement according to claim 10, wherein power electronics are arranged between the safety device and the electric motors.

18. Actuator arrangement for a clutch of a drive train for motor vehicles, which clutch is prestressed into an opened position and can be activated electromechanically, having an electric motor which can be coupled to the clutch in order to activate it, and having a control unit for actuating the electric motor, wherein the actuator arrangement has a safety device. wherein the safety device is a safety hardware component which is provided separately from the control unit and docs not include a microprocessor, wherein the safety device is connected to the electric motor parallel to the control unit, and the safety device is configured, in case of a fault state of the control unit, to supply electrical power to the electric motor independently of the control unit in order to always open the clutch and transform the clutch within a short time into a safe state.

* * * * *